United States Patent
Levasseur et al.

(10) Patent No.: US 6,169,801 B1
(45) Date of Patent: Jan. 2, 2001

(54) DIGITAL ISOLATION APPARATUS AND METHOD

(75) Inventors: David James Levasseur; Richard Miles Wetzel; Donald Burnell Rigdon, all of Watertown, SD (US)

(73) Assignee: Midcom, Inc., Watertown, SD (US)

( * ) Notice: Under 35 U.S.C. 154(b), the term of this patent shall be extended for 0 days.

(21) Appl. No.: 09/039,744

(22) Filed: Mar. 16, 1998

(51) Int. Cl.$^7$ .......................................... H04M 1/00
(52) U.S. Cl. .................... 379/413; 379/412; 379/399; 370/279; 370/286; 700/94
(58) Field of Search .................... 379/413, 412, 379/399, 411; 257/82, 58; 370/294, 286, 463; 700/94; 375/28

(56) References Cited

U.S. PATENT DOCUMENTS

| | | |
|---|---|---|
| 2,375,309 | 5/1945 | McCoy . |
| 3,183,309 | 5/1965 | Hunt . |
| 3,333,166 | 7/1967 | Hochman . |
| 3,641,441 | 2/1972 | Gunn et al. . |
| 3,642,268 | 2/1972 | Hipsher . |
| 3,652,968 | 3/1972 | Johnston et al. . |
| 3,765,082 | 10/1973 | Zyetz . |
| 3,833,872 | 9/1974 | Marcus et al. . |
| 3,852,563 | 12/1974 | Bohorquez et al. . |
| 3,958,328 | 5/1976 | Lee . |
| 3,974,517 | 8/1976 | Sanders et al. . |
| 3,988,823 | 11/1976 | Hu . |
| 4,021,617 | 5/1977 | Jones, Jr. et al. . |
| 4,045,615 | 8/1977 | James et al. . |
| 4,118,603 | 10/1978 | Kumhyr . |

(List continued on next page.)

FOREIGN PATENT DOCUMENTS

| | | |
|---|---|---|
| 9055089 | 11/1990 | (AU) . |
| 1181186 | 1/1985 | (CA) . |
| 2017062 | 11/1990 | (CA) . |
| 1053154 | 7/1991 | (CN) . |
| 4424833 | 1/1996 | (DE) . |
| 36800 | 9/1981 | (EP) . |
| 68828 | 1/1983 | (EP) . |
| 398723 | 11/1990 | (EP) . |
| 540157 | 5/1993 | (EP) . |
| 0 573 721 A1 | 12/1993 | (EP) . |
| 0 576 882 A2 | 1/1994 | (EP) . |
| 0 576 882 A2 * | 5/1994 | (EP) .............................. H02H 3/00 |
| 1428742 | 3/1976 | (GB) . |
| 1591870 | 6/1981 | (GB) . |
| 2 102 230 | 1/1983 | (GB) . |

(List continued on next page.)

OTHER PUBLICATIONS

TP 399317 International Technology Disclosure, Sep. 25, 1993, Abstract only.

Primary Examiner—Tālivaldis I. Šmits
Assistant Examiner—Vijay B. Chawan
(74) Attorney, Agent, or Firm—Merchant & Gould P.C.

(57) ABSTRACT

A digital isolation apparatus for coupling between a telecommunication network and a digital signal processing device. A CODEC is arranged to couple to the telecommunication network, convert a first set of analog signals from the telecommunication network to a first set of digital signals, and convert a second set of digital signals to a second set of analog signals to the telecommunication network. A digital isolation device, arranged to connect between the CODEC and the digital signal processing device, pass the first set of digital signals from the CODEC to the digital signal processing device, and pass the second set of digital signals from the digital signal processing device to the CODEC. A power supply assembly supplies power to the CODEC via the digital isolation device.

10 Claims, 3 Drawing Sheets

U.S. PATENT DOCUMENTS

| | | |
|---|---|---|
| 4,136,349 | 1/1979 | Tsang . |
| 4,174,562 | 11/1979 | Sanders et al. . |
| 4,203,146 | 5/1980 | Sabetella et al. . |
| 4,213,806 | 7/1980 | Tsang . |
| 4,230,187 | 10/1980 | Seto et al. . |
| 4,238,753 | 12/1980 | Bayer . |
| 4,250,479 | 2/1981 | Bausch et al. . |
| 4,261,096 | 4/1981 | Sanders et al. . |
| 4,281,448 | 8/1981 | Barry et al. . |
| 4,310,867 | 1/1982 | Shreve et al. . |
| 4,345,115 | 8/1982 | Sweet . |
| 4,389,544 * | 6/1983 | Wagner et al. ............... 370/105 |
| 4,395,590 | 7/1983 | Pierce et al. . |
| 4,417,099 | 11/1983 | Pierce . |
| 4,450,556 * | 5/1984 | Boleda et al. ............... 370/58 |
| 4,466,012 | 8/1984 | Fukushima . |
| 4,466,107 | 8/1984 | Stoner . |
| 4,543,553 | 9/1985 | Mandai et al. . |
| 4,547,809 | 10/1985 | Southgate . |
| 4,572,900 | 2/1986 | Wohltjen . |
| 4,607,139 | 8/1986 | Froment et al. . |
| 4,617,543 | 10/1986 | Akachi et al. . |
| 4,621,414 | 11/1986 | Iranmanesh . |
| 4,741,031 | 4/1988 | Grandstaff . |
| 4,748,419 | 5/1988 | Somerville . |
| 4,757,528 | 7/1988 | Falater et al. . |
| 4,762,805 | 8/1988 | Cheung et al. . |
| 4,780,795 | 10/1988 | Meinel . |
| 4,784,001 | 11/1988 | Gaertner . |
| 4,794,507 | 12/1988 | Cavigelli . |
| 4,803,719 | 2/1989 | Ulrich . |
| 4,805,214 | 2/1989 | Fensch et al. . |
| 4,835,486 | 5/1989 | Somerville . |
| 4,843,339 | 6/1989 | Burt et al. . |
| 4,864,605 | 9/1989 | Ramsay et al. . |
| 4,896,349 | 1/1990 | Kubo et al. . |
| 4,922,318 | 5/1990 | Thomas et al. . |
| 4,951,168 | 8/1990 | Harrison . |
| 4,972,436 * | 11/1990 | Halim et al. ............... 375/28 |
| 5,013,980 | 5/1991 | Stephens et al. . |
| 5,015,984 | 5/1991 | Vialaneix . |
| 5,027,167 | 6/1991 | Kagaya et al. . |
| 5,033,062 | 7/1991 | Morrow et al. . |
| 5,116,775 | 5/1992 | Katto et al. . |
| 5,134,307 | 7/1992 | Nakano . |
| 5,134,648 | 7/1992 | Hochfield et al. . |
| 5,150,091 | 9/1992 | Hart et al. . |
| 5,196,377 | 3/1993 | Wagner et al. . |
| 5,200,731 | 4/1993 | Tochio et al. . |
| 5,222,129 | 6/1993 | Bonvallet et al. . |
| 5,224,154 | 6/1993 | Aldridge et al. . |
| 5,245,654 | 9/1993 | Wilkison et al. . |
| 5,266,815 | 11/1993 | Sunami et al. . |
| 5,278,899 | 1/1994 | Levitan . |
| 5,280,526 | 1/1994 | Laturell . |
| 5,286,666 | 2/1994 | Katto et al. . |
| 5,302,932 | 4/1994 | Person et al. . |
| 5,304,274 | 4/1994 | Crownover et al. . |
| 5,312,674 | 5/1994 | Haertling et al. . |
| 5,347,577 | 9/1994 | Takato et al. . |
| 5,349,743 | 9/1994 | Grader et al. . |
| 5,361,037 | 11/1994 | Qui . |
| 5,369,666 | 11/1994 | Folwell et al. . |
| 5,369,687 | 11/1994 | Farkas . |
| 5,389,565 | 2/1995 | Gyure et al. . |
| 5,424,709 | 6/1995 | Tal . |
| 5,426,697 | 6/1995 | McGrane . |
| 5,438,167 | 8/1995 | McClanahan et al. . |
| 5,438,210 * | 8/1995 | Worley ............... 257/82 |
| 5,442,534 | 8/1995 | Cuk et al. . |
| 5,444,427 | 8/1995 | Ida et al. . |
| 5,455,726 | 10/1995 | Liu . |
| 5,465,298 | 11/1995 | Wilkinson et al. . |
| 5,473,552 | 12/1995 | Chen et al. . |
| 5,476,728 | 12/1995 | Nakano et al. . |
| 5,479,445 | 12/1995 | Kloker et al. . |
| 5,479,695 | 1/1996 | Grader et al. . |
| 5,498,896 | 3/1996 | Gyure et al. . |
| 5,500,895 * | 3/1996 | Yurgelites ............... 379/412 |
| 5,509,126 | 4/1996 | Oprescu et al. . |
| 5,511,069 | 4/1996 | England et al. . |
| 5,515,022 | 5/1996 | Haertling et al. . |
| 5,517,154 | 5/1996 | Baker et al. . |
| 5,521,974 | 5/1996 | Hayashi et al. . |
| 5,528,630 | 6/1996 | Ashley et al. . |
| 5,532,667 | 7/1996 | Haertling et al. . |
| 5,533,053 | 7/1996 | Hershbarger . |
| 5,538,916 | 7/1996 | Kuroi et al. . |
| 5,539,820 | 7/1996 | Pistilli . |
| 5,541,985 | 7/1996 | Ishii et al. . |
| 5,551,146 | 9/1996 | Kawabata . |
| 5,555,293 | 9/1996 | Krause . |
| 5,555,545 | 9/1996 | Yang . |
| 5,568,815 * | 10/1996 | Raynes et al. ............... 128/672 |
| 5,574,749 | 11/1996 | Nelson et al. . |
| 5,602,912 | 2/1997 | Hershbarger . |
| 5,614,757 | 3/1997 | Person et al. . |
| 5,654,984 | 8/1997 | Hershbarger et al. . |
| 5,661,647 | 8/1997 | Washburn et al. . |
| 5,671,251 | 9/1997 | Blackwell et al. . |
| 6,041,295 * | 3/2000 | Hinderks ............... 704/206 |

FOREIGN PATENT DOCUMENTS

| | | |
|---|---|---|
| 2214761 | 9/1989 | (GB) . |
| 58-002041 | 1/1983 | (JP) . |
| 61-51902 | 3/1986 | (JP) . |
| 61-54608 | 3/1986 | (JP) . |
| 61-198101 | 9/1986 | (JP) . |
| 62-131537 | 6/1987 | (JP) . |
| 63-095645 | 4/1988 | (JP) . |
| 3296359 | 12/1991 | (JP) . |
| 5218013 | 8/1993 | (JP) . |
| 8023673 | 1/1996 | (JP) . |
| 8902345 | 4/1991 | (NL) . |
| 1827051 | 7/1993 | (SU) . |
| 98/09411 * | 5/1994 | (WO) ............... H04L 27/06 |
| WO 98/09411 | 3/1998 | (WO) . |
| 9406757 | 6/1995 | (ZA) . |

* cited by examiner

DIGITAL ISOLATION APPARATUS AND METHOD

BACKGROUND OF THE INVENTION

1. Field of the Invention

The present invention relates to the field of telephonic devices, and more particularly to a digital isolation apparatus and method and a power supply and method for the telephonic devices.

2. Description of Related Art

Generally, before a device can be legally connected to a public telephone network 40 as shown in FIG. 1, it must be granted approval by one or more safety agencies. Approval status (pass or fail) is determined by testing the device according to the agency's safety requirements. The testing typically includes the verification that an effective electrical isolation barrier 48 as shown in FIG. 1 exists between a user-connected device (equipment-side) and the telephone network (loop-side). Verification that the isolation barrier meets the safety requirements set forth by the relevant agency is a key to proving that a product can safely be connected to the public telephone network 40. It also means that an electronic device, e.g. a Digital Signal Processing (DSP) device 52, will be sufficiently isolated from the telephone network 40 in the event lightning strikes the telephone line or an electric power line falls across or otherwise contacts the telephone line.

In addition, to maintain isolation, the telephone network-side (loop-side) electronic circuits (as shown in FIGS. 1, 2, and 5, left of isolation lines 46, 56, and 72) are generally powered by the telephone network 40. Typically, the electronic circuits on the loop-side that are powered by the telephone network 40 require additional complex power supply circuits. Alternatively, some of the electronic circuits may be powered by means of a conventional battery power supply. Accordingly, these conventional power supplies add significant cost and complexity to telephone network interface designs. Therefore, a need exists for a low cost, efficient technique of providing an isolated source of power from a safe-side, for instance, equipment-side to the loop-side.

FIG. 1 illustrates a conventional arrangement where an isolation barrier 48 resides in a section of circuitry commonly referred to in the telephone industry as a Data Access Arrangement (DAA) 42 (FIG. 1). Originally, the function of the DAA was solely to protect the telephone network 40 from a malfunctioning user-connected device. The DAA was designed to be a stand alone, separate piece of equipment. Today, the term DAA can be more broadly applied to encompass the circuitry in a piece of telephonic equipment that provides a similar isolation function for safety purposes as the original stand alone DAA 42.

FIG. 1 illustrates the conventional isolation safety barrier 48 coupled directly to a telephone line interface circuit 44 on one end and coupled to a Coder/Decoder (CODEC) 50 as shown in FIGS. 1–5 on the opposite end. The CODEC 50 usually contains both an analog-to-digital (A/D) converter and a digital-to-analog (D/A) converter.

The conventional isolation device 48 is an analog isolation device, such as an analog transformer whose function is to isolate loop-side from the equipment-side. The analog transformer passes the entire frequency band of analog signals from the telephone network via the telephone line interface circuit 44 to the CODEC 50 which is connected to the DSP device 52. The interface between the telephone network 40 and the DSP device 52 can be arranged and configured to function as a modem. In the example of a modem, the band of frequencies ranges from 10 Hz to 4,000 Hz.

Several disadvantages exist with a conventional analog transformer as an isolation device. First, the size of an analog transformer is generally too big. Excursions along the analog transformer's electromagnetic B-H loop causes distortions in the analog signal passed by the transformer. Smaller transformers have greater excursions along the B-H loop as compared with larger transformers. Therefore, larger analog transformers perform better than smaller ones. As more and more demand for a smaller size of the transformer, a point is reached where it becomes physically too small to function properly due to the distortions. Additionally, further size reduction of a transformer reduces the internal creepage and clearance distances required for isolation. If the creepage and clearance distances become too small, the transformer will not function as an effective isolation barrier, and the user-connected device may become unsafe for use on the public telephone network. Larger, higher performance, transformers are too large for applications such as a PCMCIA modem requiring a relatively small transformer. Currently, the PCMCIA modem is constrained to fit in a space equivalent to a stack of three credit cards. In this application, the transformer's small size can result in analog signal distortion that severely hampers the modem's performance.

A proposed approach of reducing the size of the transformer is to move the isolation barrier 48 from the analog interface to the digital interface 56 as shown in FIG. 2. However, this method requires a power source for the loop-side coding and decoding (CODEC) circuitry. In the existing proposal, the power source is provided by the telephone network 40 or by a separate battery supply.

One disadvantage associated with powering the loop-side circuitry from the telephone network 40 relates to sensing the state of the telephone line. It requires detecting a voltage between a telephone network connection's TIP and RING lines. TIP and RING are typically two lines that carry data, ringing signal, and dial tone from the telephone network's central office to a user connection. The TIP and RING lines have two states, ON-HOOK and OFF-HOOK. The state of the telephone line, when not in use, is referred to as ON-HOOK. Whereas OFF-HOOK refers to the state of the telephone line when it is in use. Typically, the voltage between TIP and RING while the telephone line is ON-HOOK is approximately 48 VDC. Alternatively, while in the OFF-HOOK state, the voltage drops to a level between 6 and 12 VDC. Sensing the voltage across TIP and RING while the telephone line is ON-HOOK, for the purpose of obtaining power for the proposed approach, requires that the circuitry draw an extremely small amount of current. Otherwise, the telephone network central office switching circuits will sense the current flowing through the telephone line causing it to go OFF-HOOK. Generally, telephone networks require the ON-HOOK current thresholds to be much lower than 3 milli-amps and are typically set at 10 micro-amps. Accordingly, sensing the state of the telephone line for obtaining power for the loop-side CODEC in the above proposed approach cannot be readily accomplished.

Alternatively, power may be obtained from the telephone line while it is OFF-HOOK via the ringing signal. Generally, this technique is difficult to implement because the ringing signal has a much higher voltage than that of standard silicon circuits. In addition, the ringing signal is typically shared with other telephonic devices connected to the same line.

Drawing too much current from the ringing signal may cause the telephone network central office equipment to assume the device(s) went OFF-HOOK, thus failing a registration test.

It can be seen that there is a need for an improved apparatus and method of isolating signals between the telephone network and digital processing devices.

It can also be seen that there is a need for an improved apparatus and method of supplying power to the loop-side circuitry.

SUMMARY OF THE INVENTION

To overcome the limitations in the prior art described above, and to overcome other limitations that will become apparent upon reading and understanding the present specification, the present invention discloses an improved apparatus and method for providing digital isolation between the telephone network and telephone devices and an improved power supply.

The present invention solves the above-described problems by providing an isolation barrier at a digital interface and by supplying an isolated power source via the isolation barrier.

One aspect of the present invention is to isolate digital signal processing devices from a telephone network. In one embodiment, a CODEC is connected between a telephone interface circuit and a digital isolation device.

Accordingly, signal distortions caused by the analog transformer at the analog telephone interface side are eliminated in the present invention.

Further in one embodiment, a digital clock signal is used for supplying power to the CODEC via the digital isolation device. In one embodiment, the digital isolation device includes an isolation transformer barrier. In alternative embodiments, the digital isolation device can be any device capable of passing digital data signals and digital clock signals to and from the CODEC and a digital signal processing device. Such digital isolation devices may include pulse transformers; ceramic devices such as transformers, capacitors, and piezoelectric transducers; optical couplers; or any other devices capable of passing digital data signals and digital clock signals (or referred to power signals).

Another aspect of the present invention is that the present invention can be used in many telephonic devices, such as modems, fax, ATM, PBX (Private Branch Exchange), etc.

A further aspect of the present invention is that the digital clock signal is obtained from a digital clock at the digital processing device. The digital clock generates signals, such as square wave signals, and supplies the signals to the loop-side electronic circuitry via the digital isolation barrier. In one embodiment, the digital clock signal can be generated by the same clock which provides synchronizing pulses for electrical devices. Further, in one embodiment, the digital clock signal transfers its power across the digital isolation barrier, such as a transformer. In an alternative embodiment, the digital clock signal may transfer its power across an isolation barrier such as optical, piezo-electric, capacitive, or other isolation barrier devices.

The present invention is also a method of supplying isolated power from the equipment-side to the loop-side via a digital isolation barrier. In one embodiment, a power conversion circuitry receives a digital clock signal from the equipment-side and provides electric power to the CODEC. Still in one embodiment, the signals from the power conversion circuitry also provide electric power to the telephone line interface circuitry.

Yet in one embodiment, the present invention provides isolation between a CODEC and the digital processing devices such as wireline telephonic devices including: digital telephones, modems, fax machines, answering machines, caller-ID equipment, Private Branch Exchange (PBX) equipment, call diverters, conferencing systems, speakerphones, etc. The invention provides isolation at the digital interface 56 shown in FIGS. 2 and 4 following the CODEC's 50 conversion of analog signals into digital signals. In one embodiment, the isolation technique utilized in the present invention is preferably magnetic, in the form of a pulse transformer; however, other suitable isolation techniques such as optical devices, capacitors, or piezo-electric devices, etc., may be used within the principles of the present invention.

Further in one embodiment of the present invention, the equipment-side digital processing circuitry 52 shown in FIGS. 1–5 may be modified to interface several common computer bus architectures such as: Peripheral Component Interconnect (PCI), Instrument Standard Architecture (ISA) bus, Extended Instrument Standard Architecture (EISA) bus, Microchannel, NuBus, VMX, Universal Serial Bus (USB), FireWire (see IEEE-1394), etc.

Still in one embodiment, a digital clock signal is transferred across an isolation channel of the isolation devices to the CODEC and simultaneously to a power conversion circuit that is able to convert the clock signal into an isolated power source. Thus, the present invention eliminates the need for the loop-side electronic circuitry to obtain power from: the telephone network or from a separate battery source, or from other separate sources.

Several advantages arise by providing power to the loop-side circuitry from the equipment-side clock signal, independent of the telephone network 40. One advantage is that the source for the loop-side electronic circuitry can be provided without drawing a current from a telephone line, which may change a state of the telephone line. Another advantage is that it can provide power for other circuits such as caller ID, etc. A further advantage is that the clock signal can be generated from a master clock that is usually utilized for synchronizing transmit/receive signals.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
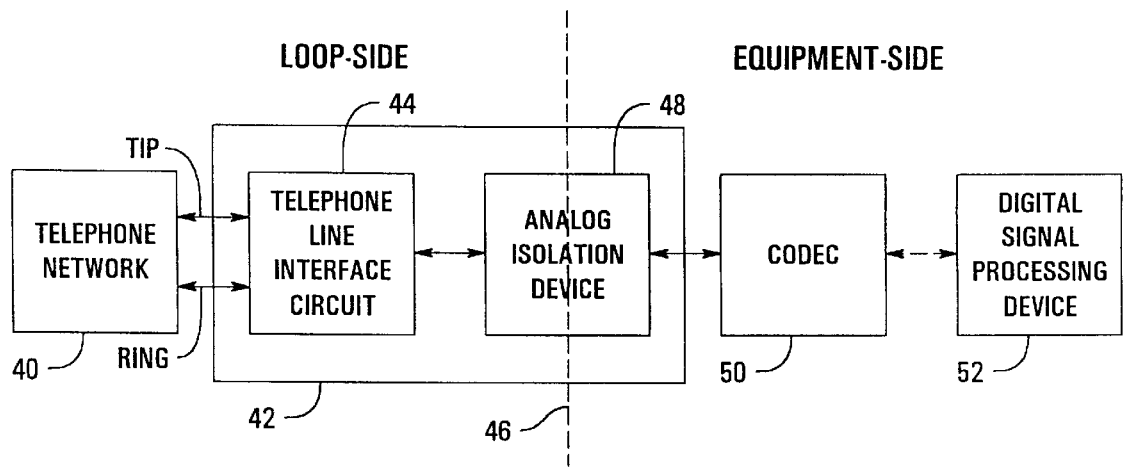
FIG. 1 is a block diagram of a conventional Data Access Arrangement (DAA) with connections between a telephone network and digital signal processing devices.

FIG. 1 illustrates a conventional Data Access Arrangement (DAA) 42 between a telephone network 40 and a Digital-to-Analog/Analog-to-Digital converter, commonly referred to as a CODEC 50, which is connected to the digital signal processing device 52. The DAA 42 includes an analog isolation device 48 which provides an analog isolation between a telephone line interface circuit 44 connected to the telephone network 40 and the CODEC 50. The CODEC 50 converts the analog signals from the telephone network 40 to digital signals. The isolated digital signals are then sent to a digital signal processing device 52. The isolation by the analog isolation device 48 is generally illustrated by a phantom line 46 which divides circuits into a loop-side and an equipment-side.

Figure 2:
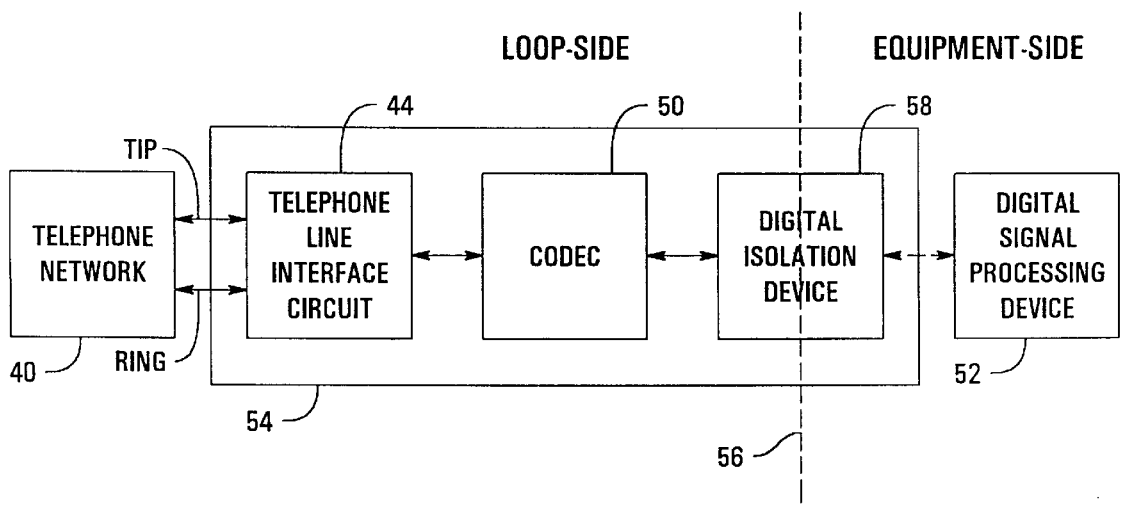
FIG. 2 is a block diagram of a digital isolation device in accordance with the present invention.

FIG. 2 illustrates a digital isolation device in accordance with the principles of the present invention. A digital isolation device 58 provides an isolation between the telephone line interface circuit 44 and the CODEC 50 generally illustrated by a phantom line 56. Data is exchanged between the loop-side and the equipment-side. A DAA 54 includes a digital isolation device 58 which provides an isolation barrier between the CODEC 50 and the digital processing device 52. The DAA 54 is connected to the telephone network 40 with no isolation between the CODEC 50 and the telephone network 40. Accordingly, isolation is provided at the digital side of a telephonic device.

Figure 3:
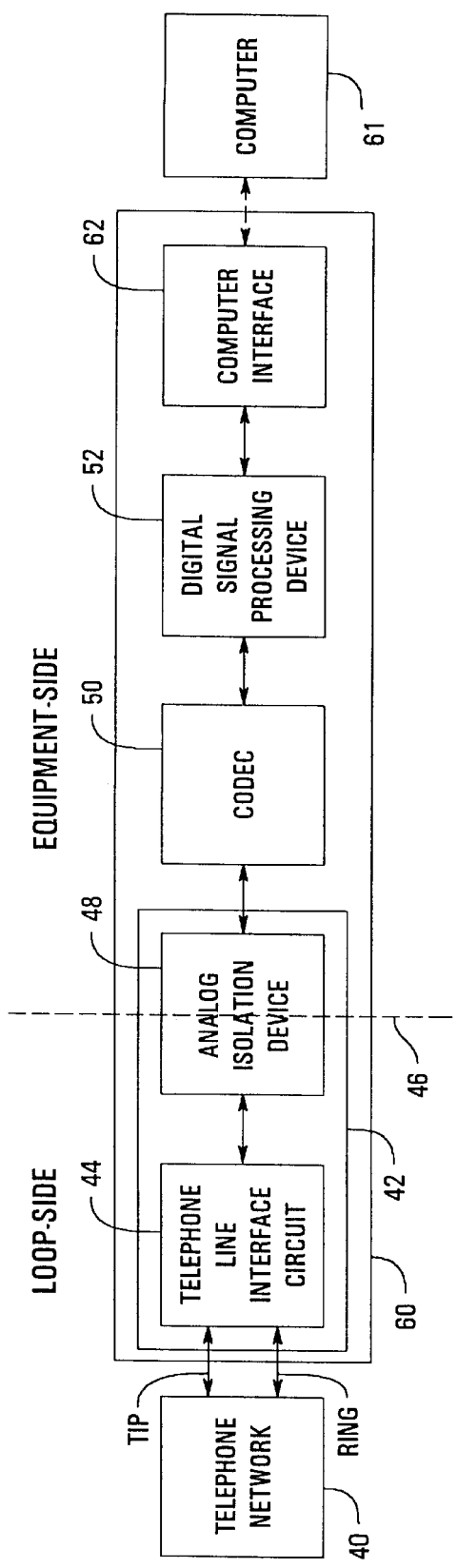
FIG. 3 is a block diagram of a conventional modem-type device with connections between a telephone network and a computer.

FIG. 3 illustrates a conventional modem-type device 60 with an analog isolation between the loop-side and the equipment-side. The modem-type device 60 may include the analog DAA 42 in communication with the DSP 52. The modem-type device 60 can be connected between the telephone network 40 and a computer 61. The modem-type device 60 may include an interface circuit 62.

Figure 4:
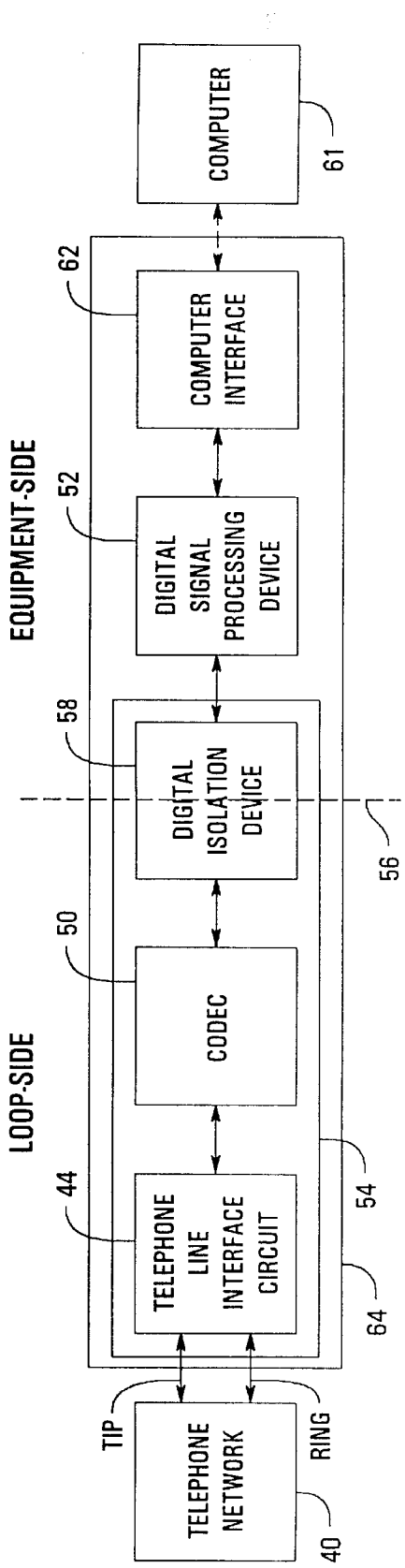
FIG. 4 is a block diagram of the digital isolation device of FIG. 2 used in a modem-type device.

FIG. 4 illustrates a modem-type device 64 in accordance with the principles of the present invention with a digital isolation between the loop-side and equipment-side. The modem-type device 64 may include the digital DAA 54 in communication with the DSP 52. The modem-type device 64 can be connected between the telephone network 40 and the computer 61. The modem-type device 64 may include the interface circuit 62.

Figure 5:
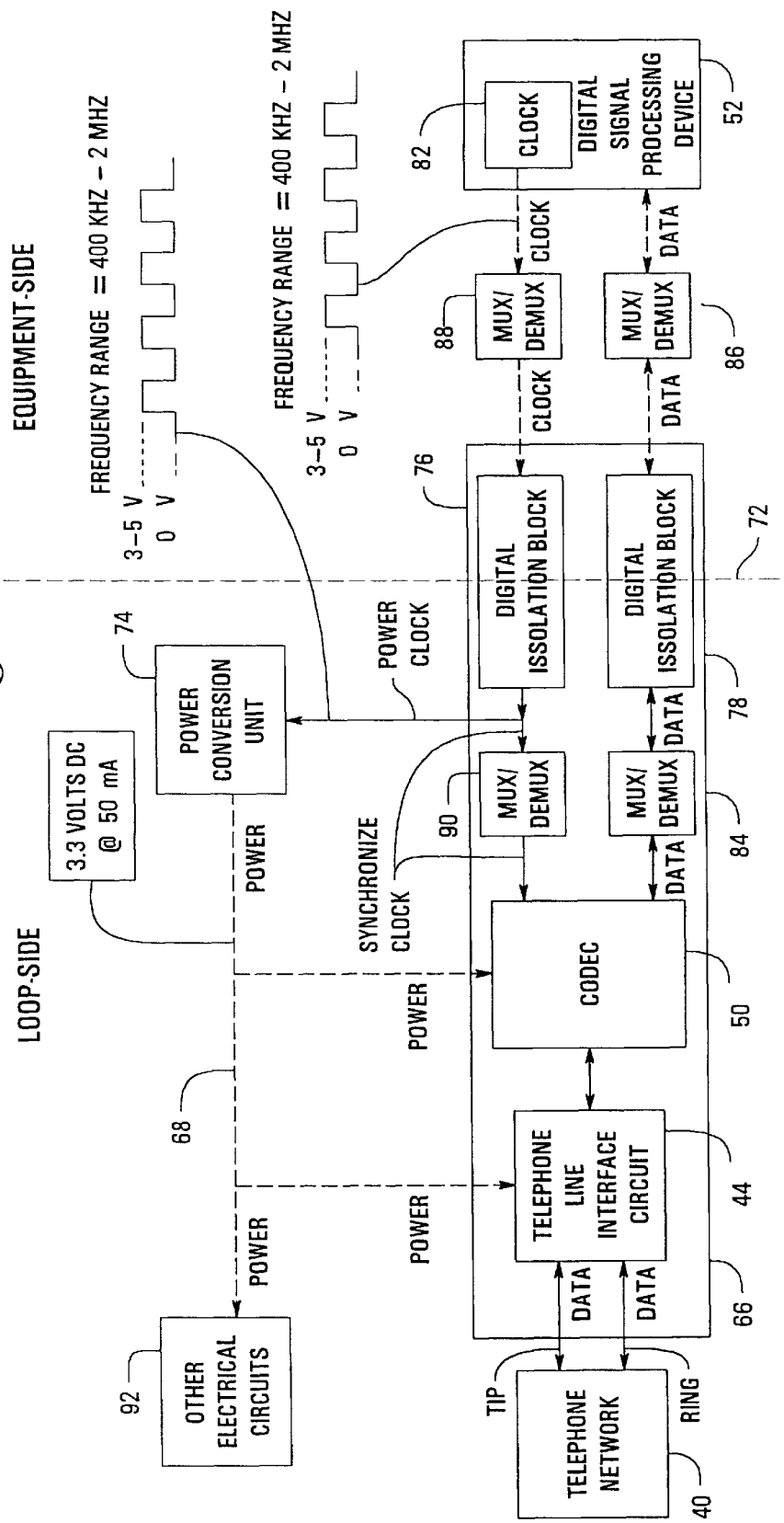
FIG. 5 is a block diagram of the digital isolation device used in a modem-type device that supplies loop-side electronics with an isolated power supply, and of a power conversion circuit received by a digital clock signal via the digital isolation device, in accordance with the present invention.

FIG. 5 illustrates an alternative embodiment of a DAA 66 generally in accordance with the principles of the present invention with a digital isolation between the equipment-side and the loop-side, generally illustrated by a phantom line 72. A digital isolation block 76 of the digital isolation device 58 transmits a digital clock signal from the equipment-side to the loop-side. On the loop-side, the clock signal functions both to synchronize the CODEC 50 and to provide an input to a power conversion circuit 74. The clock signal frequency can be any frequency. In a preferred embodiment, the frequency of the clock signal may range between 400 kHz and 2 MHz. The power conversion circuit 74 converts the clock signal (e.g. square wave A.C.) to a direct current (D.C.) power 68. The D.C. power 68 can range from 2 to 12 Volts, and in one embodiment, from 3 to 6 Volts, and further in the preferred embodiment, from 3.3 to 5 Volts. D.C. power 68 is supplied to the CODEC 50 and the telephone line interface 44 or any other suitable circuits 92. A digital isolation block 78 of the digital isolation device 58 transmits data from/to the CODEC 50, on the loop-side, and to/from the digital signal processing device 52, on the equipment-side. In a multiple channel application, data signals are de/multiplexed by a mux/demux 84 and a mux/demux 86. The clock signals are de/multiplexed by a mux/demux 88 and a mux/demux 90. The CODEC 50 and DSP 52 digital connections may include many, e.g. sixteen separate wire connections. Mux/Demuxes can be used to minimize the number of channels required to be isolated. In one embodiment, the number of physical wire connections can be reduced to two wire connections per channel, with a total of four channels. In an alternative embodiment, a single pair of wire connections with a single digital isolation device can also be used to transmit the data signals and the clock signal.

Still in FIG. 5, the digital signal processing device 52 may include a clock 82 for providing a clock signal to be used as a power. The clock 82 can be a master clock of the digital signal processing device 52 which usually provides a synchronizing function for transmit/receive data in the modem-type device 66.

Figure 6:
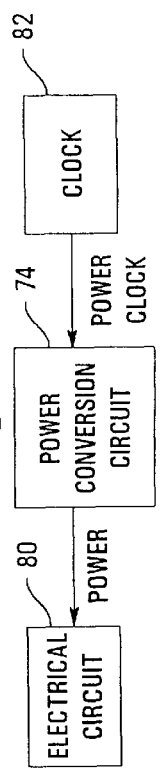
FIG. 6 is a block diagram of the digital clock signal being supplied to the power conversion circuit to generate an isolated power supply for electronic devices.

FIG. 6 illustrates the clock 82 providing a digital clock signal to the power conversion circuit 74. The power conversion circuit 74 converts the A.C. power to D.C. power and sends the D.C. power to an electrical circuit 80.

In operation, the digital isolation device 58 isolates the loop-side from equipment-side at the digital interfaces generally illustrated by phantom lines 56 and 72. In the preferred embodiment, the digital isolation device 58 can be pulse transformers. In alternative embodiments, the digital isolation device 58 can be optical couplers, capacitors, piezo-electric, or other suitable devices which are capable of transmitting/receiving data and power signals.

In the present invention as illustrated in one embodiment shown in FIG. 5, ring detection can be performed using a conventional opto-isolator circuit contained within the telephone line interface 44. Power is not drawn from the telephone network 40 by the DAA 66. Also, there is no external battery required to supply power to the loop-side circuitry. All loop-side electronic devices, CODEC 50, telephone line interface circuit 44, and other electrical circuits 92, etc., are powered by the energy transferred across the digital isolation block 76 of the digital isolation device 58.

Further in FIG. 5, the CODEC 50 converts analog signals from the telephone network 40 to digital signals and sends them to the mux/demux 84 on the loop-side. The digital signals are then transmitted across the digital isolation block 78 of the digital isolation device 58 to the mux/demux 86 on the equipment-side. The mux/demux 86 sends the digital signals to the DSP device 52.

Still in FIG. 5, the DSP 52 transmits the clock signal through the mux/demux 88 and subsequently through the digital isolation block 76 to the power conversion circuit 74 for supplying power in one branch and to the mux/demux 90 and the CODEC 50 for synchronization in the other branch.

The digital clock signal synchronizes data communications in the modem-type device 66. The power conversion circuit 74 converts the A.C. power of the clock signals to the D.C. power 68 to power the loop-side electrical circuits, such as the CODEC 50, etc. Accordingly, an isolated power source is provided to the CODEC 50 and other circuits.

The power conversion circuit 74 may include high-frequency, schottky diodes, arranged in a half-wave bridge rectifier.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A digital isolation apparatus for coupling between a telecommunication network disposed on a loop side and a digital signal processing device on an equipment side, comprising:

a CODEC disposed on the loop side, arranged to couple to the telecommunication network, convert a first set of analog signals from the telecommunication network to a first set of digital signals, and convert a second set of digital signals to a second set of analog signals to the telecommunication network;

a digital isolation device arranged to connect between the CODEC and the digital signal processing device, the digital isolation device passing the first set of digital signals from the CODEC to the digital signal processing device and passing the second set of digital signals from the digital signal processing device to the CODEC; and a digital clock disposed in the digital signal processing device on the equipment side synchronizing the CODEC and providing a direct current power to the CODEC on the loop side, the digital clock sending a digital clock signal from the equipment side to the CODEC on the loop side via the digital isolation device.

2. The digital isolation apparatus according to claim 1, wherein only digital signals cross the digital isolation device.

3. The digital isolation apparatus according to claim 1, wherein the digital isolation device comprises at least one transformer.

4. The digital isolation apparatus according to claim 1, wherein the digital isolation device comprises at least one pulse transformer.

5. The digital isolation apparatus according to claim 1, wherein the digital isolation device comprises at least one ceramic transformer.

6. The digital isolation apparatus according to claim 1, wherein the digital isolation device comprises at least one optical isolation device.

7. The digital isolation apparatus according to claim 1, wherein the digital isolation device comprises at least one capacitive isolation device.

8. The digital isolation apparatus according to claim 1, wherein the digital signal processing device includes an electrical interface to a telephonic device.

9. The digital isolation apparatus according to claim 1, wherein the digital signal processing device includes an electrical interface to a digital communications bus.

10. A modem for coupling between a telecommunication network disposed on a loop side and a digital processing device disposed on an equipment side, comprising:

a CODEC disposed on the loop side, arranged to couple to the telecommunication network, convert a first set of analog signals from the telecommunication network to a first set of digital signals, and convert a second set of digital signals to a second set of analog signals to the telecommunication network;

a digital isolation device arranged to connect between the CODEC and a digital signal processing device, the digital isolation device passing the first set of digital signals from the CODEC to the digital signal processing device and passing the second set of digital signals from the digital signal processing device to the CODEC, the digital signal processing device being in communication with the digital processing device; and a digital clock disposed in the digital signal processing device on the equipment side synchronizing the CODEC and providing a direct current power to the CODEC on the loop side, the digital clock sending a digital clock signal from the equipment side to the CODEC on the loop side via the digital isolation device.

* * * * *